(12) United States Patent
Kilian et al.

(10) Patent No.: US 9,811,409 B2
(45) Date of Patent: Nov. 7, 2017

(54) METHOD FOR MAINTAINING THE FUNCTIONAL ABILITY OF A FIELD DEVICE

(71) Applicant: Endress + Hauser GmbH + Co. KG, Maulburg (DE)

(72) Inventors: Markus Kilian, Merzhausen (DE); Andrea Seger, Zell (DE); Bert Von Stein, Zell (DE); Christian Wandrei, Weil am Rhein (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 225 days.

(21) Appl. No.: 14/416,081

(22) PCT Filed: Jun. 27, 2013

(86) PCT No.: PCT/EP2013/063566
§ 371 (c)(1),
(2) Date: Jan. 21, 2015

(87) PCT Pub. No.: WO2014/016076
PCT Pub. Date: Jan. 30, 2014

(65) Prior Publication Data
US 2015/0149811 A1 May 28, 2015

(30) Foreign Application Priority Data
Jul. 25, 2012 (DE) .................. 10 2012 106 774

(51) Int. Cl.
*G06F 11/00* (2006.01)
*G06F 11/07* (2006.01)
(Continued)

(52) U.S. Cl.
CPC ...... *G06F 11/0793* (2013.01); *G05B 19/0426* (2013.01); *G05B 19/4183* (2013.01);
(Continued)

(58) Field of Classification Search
CPC ............... G06F 11/0793; G06F 11/142; G06F 11/1446; G06F 11/1469; G05B 19/0426;
(Continued)

(56) References Cited

U.S. PATENT DOCUMENTS 5,784,577 A * 7/1998 Jacobson ............ G06F 12/1466
710/104
6,094,600 A * 7/2000 Sharpe, Jr. ......... G05B 19/0423
700/19
(Continued)

FOREIGN PATENT DOCUMENTS

DE 19743324 A1 4/1999
DE 19810222 A1 9/1999
(Continued)

OTHER PUBLICATIONS

German Search Report, German Patent Office, Munich, DE, Feb. 26, 2013.
(Continued)

*Primary Examiner* — Marc Duncan
(74) *Attorney, Agent, or Firm* — Bacon & Thomas, PLLC

(57) ABSTRACT

A method for maintaining the functional ability of a field device of automation technology, wherein the method comprises the following steps: monitoring the field device for at least one achieved parameter change ($\Delta n_x$), wherein the parameter change ($\Delta n_x$) converts an old parameter set ($n_{x-1}$) into a new parameter set ($n_x$), storing all parameter changes ($\Delta n_x$) achieved in the field device in a parameter change history, monitoring the field device for an occurring malfunction (F); and, performing a remediation measure, wherein the parameter change history and/or a parameter to malfunction, linking element is accessed for remediating the malfunction occurring in the field device.

5 Claims, 1 Drawing Sheet

(51) Int. Cl.
*G05B 19/042* (2006.01)
*G05B 19/418* (2006.01)
*G05B 23/02* (2006.01)

(52) U.S. Cl.
CPC ...... *G05B 23/0229* (2013.01); *G05B 23/0264* (2013.01); *Y02P 90/10* (2015.11)

(58) Field of Classification Search
CPC ............ G05B 19/4183; G05B 23/0229; G05B 23/0264; Y02P 90/10
See application file for complete search history.

(56) References Cited

U.S. PATENT DOCUMENTS

| | | | | |
|---|---|---|---|---|
| 6,449,624 | B1* | 9/2002 | Hammack | G05B 19/0426 |
| 7,120,559 | B1* | 10/2006 | Williams | G06F 11/079 |
| | | | | 702/185 |
| 7,610,354 | B2* | 10/2009 | Adams | H04L 67/125 |
| | | | | 709/217 |
| 7,725,200 | B2* | 5/2010 | Reed | G05B 19/4184 |
| | | | | 700/110 |
| 7,774,382 | B2 | 8/2010 | Franke | |
| 7,779,404 | B2* | 8/2010 | Movassaghi | H04L 41/0813 |
| | | | | 717/168 |
| 8,938,557 | B2* | 1/2015 | Meyer | G05B 19/0426 |
| | | | | 700/28 |
| 2004/0059813 | A1* | 3/2004 | Bolder | H04L 41/0859 |
| | | | | 709/224 |
| 2004/0260718 | A1* | 12/2004 | Fedorov | G06F 9/44505 |
| 2007/0250180 | A1* | 10/2007 | Bump | G05B 19/41845 |
| | | | | 700/1 |
| 2008/0303472 | A1* | 12/2008 | John | G05B 19/0426 |
| | | | | 318/568.2 |
| 2010/0223593 | A1* | 9/2010 | Eldridge | G05B 15/02 |
| | | | | 717/105 |
| 2011/0082569 | A1* | 4/2011 | Bellville | G05B 19/0426 |
| | | | | 700/79 |

FOREIGN PATENT DOCUMENTS

| | | |
|---|---|---|
| DE | 10051645 A1 | 8/2001 |
| DE | 102005013285 A1 | 10/2006 |
| DE | 102009028655 A1 | 2/2011 |
| EP | 2093639 A2 | 8/2009 |

OTHER PUBLICATIONS

International Search Report, EPO, The Netherlands, Nov. 26, 2013.
English Translation of the International Preliminary Report on Patentability, WIPO, Geneva, CH, Feb. 5, 2015.

* cited by examiner

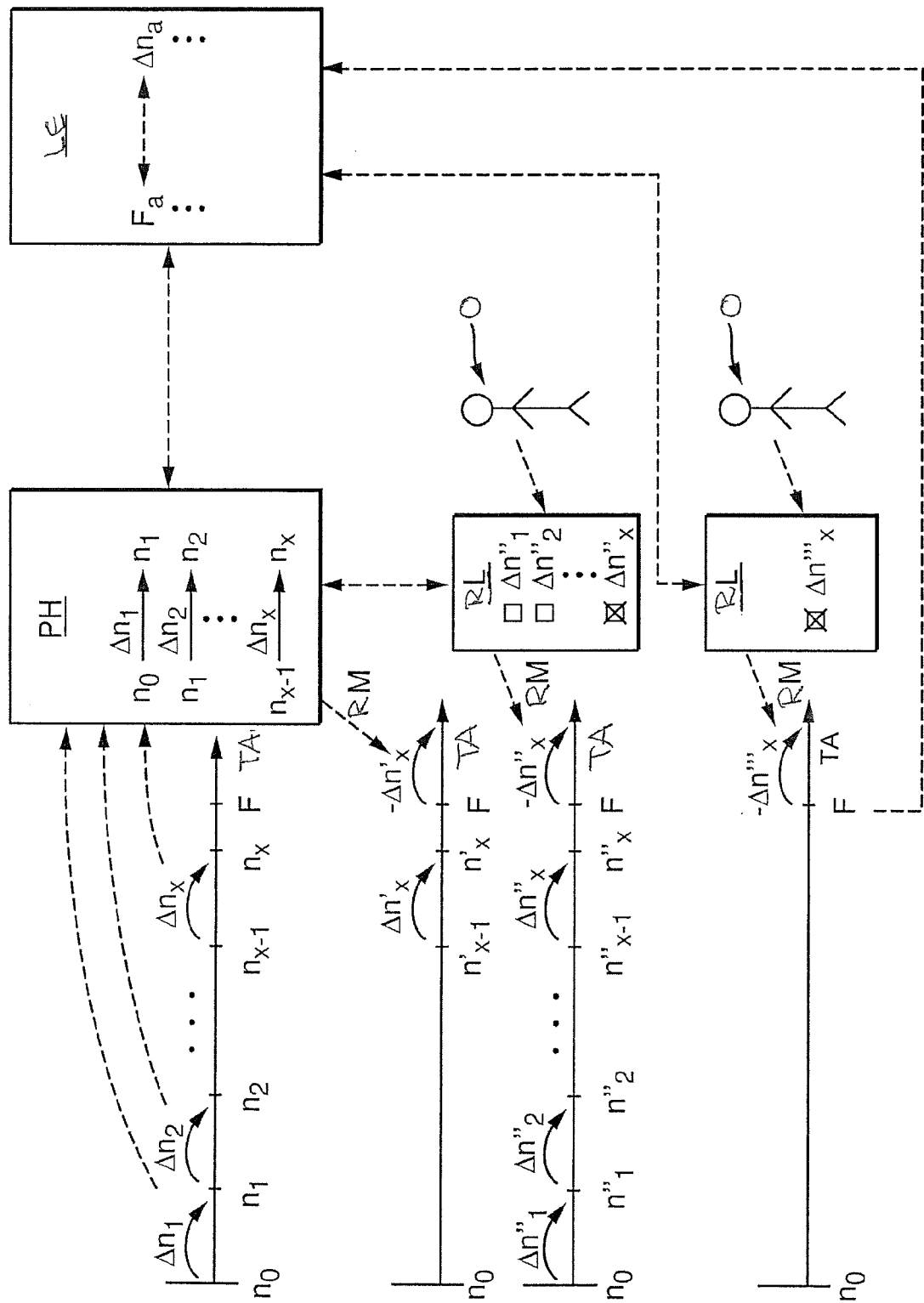

METHOD FOR MAINTAINING THE FUNCTIONAL ABILITY OF A FIELD DEVICE

TECHNICAL FIELD

The invention relates to a method for maintaining the functional ability of a field device of automation technology.

BACKGROUND DISCUSSION

In process automation technology, field devices are often applied, which serve for registering and/or influencing process variables. Serving for registering process variables are sensors, such as, for example, fill level measuring devices, flow measuring devices, pressure- and temperature-measuring devices, pH redox-potential measuring devices, conductivity measuring devices, etc., which register the respective process variables, fill level, flow, pressure, temperature, pH-value, and conductivity. Serving for influencing process variables are actuators, such as, for example, valves or pumps, via which the flow of a liquid in a section of pipeline, respectively the fill level in a container, can be changed. Referred to, in principle, as field devices are all devices, which are applied near to the process and which deliver, or process, information relevant to the process. Besides the above mentioned sensors and actuators, referred to as field devices are generally also units, which are connected directly to a fieldbus and serve for communication with the superordinated units, such as e.g. remote I/Os, gateways, linking devices and wireless adapters. A large number of such field devices are manufactured and sold by the Endress+Hauser group of companies.

Before start-up and for modifying the functioning of the field device, such must be parametered. For parametering, especially for reading and/or writing parameters, operating tools are applied. Such operating tools are, in such case, implemented, as a rule, in a communication unit separate from the respective field device and communicate with the field device via a fieldbus or via a service interface of the field device. In given cases, communication via the service interface is based on a manufacturer-specific protocol.

In order that between an operating tool connected for communication with the field device and the field device no cyclic adjustment of all data, especially parameters provided in the field device, must occur, one distinguishes between static parameters and dynamic parameters of a field device. Dynamic parameters, such as, for example, measured values, status information, error reports, etc., change their values especially as a function of the process variables to be measured or to be influenced and/or as a function of the state of the field device. Dynamic parameters of the field device are cyclically read, respectively, in the case of an actuator movement, cyclically written, as a rule, in the context of a cyclic communication by a superordinated unit, which performs the process control. In contrast, static parameters change only when something changes as regards the configuration of the field device. Such a change of the device configuration occurs, as a rule, by the servicing of the field device via an operating tool or via an onsite servicing. Such servicing is, as a rule, performed by a user or by a superordinated system. A cyclic read-out of static parameters is, in such case, not provided.

The opportunity for a user, respectively operator, or a superordinated system to change the device configuration, however, introduces the danger that the device will not be correctly parametered, so that then the field device will malfunction. In this case, the only recourse is often to return all static parameters to their state at the time of delivery. In such case, it is especially annoying that many subsequent settings, thus changes of the device configuration by means of static parameters, must be abandoned and, moreover, even a service visit can become necessary.

Options are known from the state of the art, which provide for securing the performed parameter changes in different ways. However, in all known methods, the user, respectively operator, must perform this securing. Often, in the case of a problem, there is no suitable securing, and the only recourse is to return the parameters to the state they were in at delivery. This leads to the fact that the field device cannot continue its operation or operation is continued only after an extended pause, during which the appropriate parameters are reintroduced.

SUMMARY OF THE INVENTION

On the basis of these considerations, an object of the present invention is to provide a method for operating a field device, with the assistance of which method the operation of a field device can be continued quite rapidly, in spite of the occurrence of a malfunction.

The object is achieved according to the invention by a method for maintaining the functional ability of a field device of automation technology, wherein the method includes steps as follows:
  monitoring the field device for at least one achieved parameter change, wherein the parameter change converts an old parameter set into a new parameter set;
  storing all parameter changes achieved in the field device in a parameter change history;
  monitoring the field device for an occurring malfunction; and
  performing a remediation measure, wherein the parameter change history and/or a parameter to malfunction, linking element is accessed for remediating the malfunction occurring in the field device.

According to the invention, the method, by means of which the operation of a field device can be continued in spite of occurrence of a malfunction, is achieved in that the field device continually monitors its state as regards malfunctions. Additionally, all changes of static parameters in the field device are logged. In the case of occurrence of a malfunction, the field device can link the parameter change with the occurring malfunction and via the on-site display or the operating, or servicing, tool, offer the user, respectively the operator, execution of an automatic remediation measure.

An advantageous form of embodiment of the method of the invention provides that all achieved parameter changes are stored in such a manner in the parameter change history that the old parameter set, which existed before the respectively achieved parameter change was made, can be brought back.

Another advantageous form of embodiment of the method of the invention provides that at least one of the following alternative method steps is executed for performing the remediation measure:
  revoking the parameter change last performed before the occurring malfunction, wherein the last performed parameter change is ascertained by means of the parameter change history;
  revoking at least one operator selected, parameter change, wherein available to an operator for selection are all parameter changes performed in the field device and stored in the parameter change history and in the case of selection by the operator the field device revokes such operator selected, parameter change; and revoking at least one automatically ascertained parameter change, wherein for ascertaining the at least one automatically ascertained parameter change the parameter to malfunction, linking element is accessed and wherein available to the operator for selection is this at least one automatically ascertained parameter change and in the case of selection by the operator the field device revokes such at least one automatically ascertained parameter change.

An advantageous embodiment of the method of the invention provides that for ascertaining the one automatically ascertained parameter change at least one of the following method steps is executed:

accessing the parameter to malfunction, linking element, wherein the parameter to malfunction, linking element includes at least one known malfunction, which is linked with at least one known parameter change;

comparing the occurring malfunction with all known malfunctions furnished in the parameter to malfunction, linking element, wherein in the case of an agreement of the occurring malfunction with one of the furnished known malfunctions, the known parameter change linked to the agreeing furnished known malfunction is selected; and comparing the selected known parameter change with all parameter changes performed and stored in the field device, wherein in the case of an agreement of the linked known parameter change with a parameter change performed and stored in the field device, such is offered to the operator as automatically ascertained parameter change for revocation.

The accessing of a parameter to malfunction, linking element offers the advantage that such can be dynamically adapted corresponding to latest information. In such case, the parameter to malfunction, linking element can either be furnished directly in the field device or, in order to save memory, also outside of the field device, for example, in the operating tool, in given cases linked to a server. In the case of storing outside of the field device, it is possible, moreover, to adapt the parameter to malfunction, linking element dynamically and, thus, possible to provide changes not only to a single, but, instead, simultaneously, to a number of, field devices.

Another advantageous embodiment of the method of the invention provides that the known malfunctions furnished in the parameter to malfunction, linking element are linked with known parameter changes based on statistical data and/or empirical values and/or already performed remediation measures.

Another favorable form of embodiment of the method of the invention provides that the remediation measure to be performed is selected by the operator via a remediation measures list.

By selecting the remediation measure to be performed, the operator, respectively user, obtains the opportunity to select the remediation measure that should be performed. This means that experience and knowledge of the operator, respectively user, can be utilized.

Furthermore, the method of the invention relates to a field device, which is suitable for employing, respectively performing, the method.

BRIEF DESCRIPTION OF THE DRAWING

The invention will now be explained in greater detail based on the appended drawing, the sole figure of which shows as follows:

FIG. 1 shows schematically, essential elements of the method of the invention.

DETAILED DISCUSSION IN CONJUNCTION WITH THE DRAWINGS

FIG. 1 shows essential elements for performing the method of the invention for maintaining the functional ability of a field device of automation technology. To this end, possible events are shown schematically on a time axis TA. Time axis TA serves, in such case, for simpler description, respectively representation, of possible events, which can occur for a field device, especially parameter changes $\Delta n_x$, respectively configuration changes and malfunctions occurring in the field device F. The field device has, in such case, a parameter set corresponding to the delivery state $n_0$. Starting with this parameter set $n_0$, then possible parameter changes $\Delta n_x$ are carried out in the field device. In such case, especially parameter changes $\Delta n_x$ are meant, which are performed after delivery of the field device.

Further shown in FIG. 1 are the parameter changes $\Delta n_1$-$\Delta n_x$ performed in the field device, in which case the old parameter set is designated generally with $n_{x-1}$ and the new parameter set (which results from the old parameter set and the performed parameter change $\Delta n_x$) generally with $n_x$.

The method of the invention aims, in such case, to achieve the goal that a field device, which has experienced a user initiated parameter change $\Delta n_x$, respectively configuration change, and, thereafter, over the course of its product life, a malfunction F resulting therefrom, is able to perform a remediation measure RM, in order so to maintain its functional ability. For this, the method provides that the field device or the operating, or servicing, tool accesses a parameter change history PH and/or a parameter to malfunction, linking element LE, in order with the assistance of one of these or a combination of both of these to ascertain and to perform a remediation measure RM suitable for remediating the occurring malfunction F.

The method provides for its performance that the field device retains in a parameter change history PH parameter changes $\Delta n_x$ performed during its product life. The performed parameter changes $\Delta n_x$ are kept in the parameter change history PH in such a manner that they are uniquely arranged relative to one another as a function of time of occurrence and relative to arising malfunctions.

A parameter change $\Delta n_x$ transforms an old parameter set $n_{x-1}$ stored in the field device into a new parameter set $n_x$, which is likewise stored in the field device and, thus, replaces the old parameter set $n_{x-1}$. In such case, a parameter set $n_x$ can comprise both an individual parameter, as well as also a number of individual parameters. Furthermore, an option is that both an individual parameter as well as also a number of different parameters can be changed at a certain point in time.

Parameter changes $\Delta n_x$ performed, respectively achieved, in the field device are, such as already described, kept in a parameter change history PH in a form such that the old parameter set $n_{x-1}$, which was stored in the field device before the performed, respectively achieved, parameter change $\Delta n_x$, can be reinstalled. For this, a number of variants are provided. For example, the entire parameter set $n_{x-1}$, which existed before the parameter change $\Delta n_x$ was made, can be kept in the parameter change history PH in a form such that each individual parameter is furnished with its corresponding value.

An alternative variant can be that in which not the entire parameter set $n_{x-1}$ is kept in the parameter change history PH, but, instead, only the values, which have changed as a result of the performed parameter change $\Delta n_x$. This variant offers, compared with the preceding variant, in the case of which the entire parameter set $n_{x-1}$ is stored, the advantage that memory capacity can be saved and the individual parameter sets $n_{x-1}$ can be derived by means of recursion.

By way of example, the following table shows some entries for parameter changes $\Delta n_x$ illustrating how they can be stored in the parameter change history PH:

| parameter | old value |
|---|---|
| distance unit | mm |
| 4 mA value | 100 |
| 20 mA value | 400 |
| 4 mA value | 200 |

Additionally to monitoring for a parameter change $\Delta n_x$, the field device is also monitored for an occurring malfunction F, in order, in the case of the occurrence of a malfunction F, to perform a remediation measure RM. This remediation measure RM, for remediating the occurring malfunction F, accesses either the parameter change history PH or a parameter to malfunction, linking element LE or both of these.

The parameter to malfunction, linking element LE is a kind of lookup table, in which known malfunctions are listed. Additionally in the parameter to malfunction, linking element LE, known malfunctions $F_a$ are linked with known parameter changes $\Delta n_a$, which can trigger these malfunctions. The known malfunctions $F_a$ furnished in the parameter to malfunction, linking element LE can be stored linked with the corresponding, known parameter changes $\Delta n_a$ based on statistical data and/or empirical values, for example, of the manufacturer or also of the operator O, and/or already performed remediation measures RM. In such case, it is also an option that a known malfunction $F_a$ appears a number of times in the lookup table and is linked with different known parameter changes $\Delta n_a$, all of which can trigger the same malfunction $F_a$.

In the normal case, this table, respectively the parameter to malfunction, linking element LE, is coded persistently in the field device. However, in order to save memory capacity, an option is to store such information outside of the field device, for example, where the operating tool is located. Furthermore, the parameter to malfunction, linking element LE can be embodied as a dynamic table, which can be expanded, respectively adapted, corresponding to newest knowledge concerning the effect of a known parameter change $\Delta n_a$ on a known malfunction $F_a$.

The following table gives, by way of example, some entries illustrating storing, respectively furnishing, of data in a parameter to malfunction, linking element LE:

| malfunction | parameter |
|---|---|
| S441 electrical current output | 4 mA value |
| S441 electrical current output | 20 mA value |
| C207 simulation is active | simulation mode |

As already indicated, for remediating an occurring malfunction F, a remediation measure RM is performed. In such case, the method provides three alternative steps as follows:

i. Revoking the parameter changes $\Delta n'_x$ last performed before the occurring malfunction F. For this, the parameter change history PH is used to ascertain the parameter change $\Delta n'_x$ performed before the point in time of the occurrence of the malfunction F. Based on this parameter change $\Delta n'_x$, then the parameter set $n'_{x-1}$ is reproduced, which was made before the occurrence of the malfunction F;

ii. Revoking at least one operator selected, parameter change $\Delta n''_x$. Available to the operator O for selection are all parameter changes $\Delta n_x$ performed in the field device and stored in the parameter change history PH. After selection by the operator O, the operator selected, parameter change $\Delta n''_x$ is revoked. In this way, the operator O can decide whether or not a parameter change $\Delta n_x$ is responsible for the occurrence of the malfunction F; and iii. Revoking at least one parameter change $\Delta n'''_x$ ascertained automatically by the field device or the operating, or servicing, tool. For this, the parameter to malfunction, linking element LE is accessed in such a manner that the occurring malfunction F is compared with all already known malfunctions $F_a$ furnished in the parameter to malfunction, linking element LE. In the case of an agreement, the at least one known parameter change $\Delta n_a$ linked to this known malfunction $F_a$ is selected. As already described, the parameter to malfunction, linking element LE can also link a known malfunction $F_a$ with a number of different known parameter changes $\Delta n_a$. Accordingly, the at least one selected known parameter change $\Delta n_a$ is offered to the operator O in a remediation measures list RL as automatically ascertained parameter change $\Delta n'''_x$ for revocation. The operator O can try revoking individual parameter changes $\Delta n_x$, which have an influence on the occurring malfunction F. In the case of this variant, the parameter change history PH can be omitted, which is advantageous especially in the case of field devices with little memory capacity.

An alternative variant for revocation of an automatically ascertained parameter change $\Delta n'''_x$ provides that the at least one known parameter change $\Delta n_a$ ascertained by means of the parameter to malfunction, linking element LE is supplementally compared with the parameter changes $\Delta n_x$ stored in the parameter change history PH and only in the case of additional agreement with one of the entries of the parameter change history PH is such offered to the operator O by means of a remediation measures list RL for revocation.

The invention claimed is:

1. A method for maintaining the functional ability of a field device of automation technology, comprising the steps of:

monitoring the field device for at least one achieved parameter change ($\Delta n_x$); wherein the parameter change ($\Delta n_x$) converts an old parameter set ($n_{x31\ 1}$) into a new parameter set ($n_x$);

storing all parameter changes ($\Delta n_x$) achieved in the field device in a parameter change history (PH);

monitoring the field device for an occurring malfunction (F); and performing a remediation measure (RM), wherein the parameter change history (PH) and/or a parameter to malfunction, linking element (LE) is accessed for remediating the malfunction occurring in the field device (F), wherein:

at least one of the following alternative method steps is executed for performing said remediation measure (RM);

revoking the parameter change ($\Delta n'_x$) last performed before the occurring malfunction (F), wherein the last performed parameter change ($\Delta n'x$) is ascertained by means of the parameter change history (PH);

revoking at least one operator selected parameter change ($\Delta n''_x$), wherein available to an operator (O) for selection are all parameter changes ($\Delta n''_x$) performed in the field device and stored in the parameter change history (PH) and in the case of $\Delta\Delta TA$ selection by the operator (O) the field device revokes such operator selected, parameter change ($\Delta n''x$); and revoking at least one automatically ascertained parameter change ($\Delta n'''x$), wherein for ascertaining the at least one automatically ascertained parameter change ($\Delta'''_x$) the parameter to malfunction, linking element (LE) is accessed and wherein offered to the operator (O) for selection is this at least one automatically ascertained parameter change ($\Delta n'''_x$) and in the case of selection by the operator (O) the field device revokes such at least one automatically ascertained parameter change ($\Delta n'''x$).

2. The method as claimed in claim 1, wherein:

all achieved parameter changes ($\Delta n_x$) are stored in such a manner in the parameter change history (PH) that the old parameter set ($n_{n-1}$), which existed before the respectively achieved parameter change ($\Delta n_x$) was made, can be brought back.

3. The method as claimed in claim 1, wherein:

for ascertaining an automatically ascertained parameter change ($\Delta n'''_x$) at least one of the following method steps is executed:

accessing the parameter to malfunction, linking element (LE), wherein the parameter to malfunction, linking element (LE) includes at least one known malfunction ($F_a$), which is linked with at least one known parameter change ($\Delta n_a$);

comparing the occurring malfunction (F) with all known malfunctions ($F_a$) furnished in the parameter to malfunction, linking element (LE), wherein in the case of an agreement of the occurring malfunction (F) with one of the furnished known malfunctions ($F_a$), the known parameter change ($\Delta n_a$) linked to the agreeing furnished known malfunction (Fa) is selected;

comparing the selected known parameter change (DELTA $n_a$) with all parameter changes ($\Delta n_x$) performed and stored in the field device, wherein in the case of an agreement of the linked known parameter change ($\Delta n_a$) with a parameter change ($\Delta n_x$) performed and stored in the field device, such is offered to the operator (O) as automatically ascertained parameter change ($\Delta''''x$) for revocation.

4. The method as claimed in claim 1, wherein:

known malfunctions ($F_a$) furnished in the parameter to malfunction, linking element (LE) are linked with the known parameter changes ($\Delta n_a$) based on statistical data and/or empirical values and/or already performed remediation measures (RM).

5. The method as claimed in claim 1, wherein:

said remediation measure to be performed (RM) is selected by the operator (O) via a remediation measures list (RL).

* * * * *